(12) United States Patent
Chen et al.

(10) Patent No.: US 10,296,638 B1
(45) Date of Patent: May 21, 2019

(54) GENERATING A PROBABILITY OF MUSIC USING MACHINE LEARNING TECHNOLOGY

(71) Applicant: Snap Inc., Venice, CA (US)

(72) Inventors: Xin Chen, Torrance, CA (US); Jaewook Chung, Mountain View, CA (US); Yu Hu, Marina del Rey, CA (US); Jinhua Jiang, San Jose, CA (US); Xing Mei, Los Angeles, CA (US); Kirk Ouimet, Orem, UT (US); Ning Xu, Irvine, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 15/839,454

(22) Filed: Dec. 12, 2017

Related U.S. Application Data (60) Provisional application No. 62/552,983, filed on Aug. 31, 2017.

(51) Int. Cl.
*G06F 17/30* (2006.01)

(52) U.S. Cl.
CPC .. *G06F 17/30743* (2013.01); *G06F 17/30749* (2013.01); *G06F 17/30755* (2013.01); *G10H 2240/141* (2013.01)

(58) Field of Classification Search
CPC ........ G06F 3/165; H04H 60/37; H04H 60/58; H04L 67/10
USPC ................. 700/94; 381/56, 94.1, 94.2, 94.3; 704/200, 203, 208, 219, 256
See application file for complete search history.

(56) References Cited

U.S. PATENT DOCUMENTS

| 6,038,295 | A  | 3/2000  | Mattes      |
|-----------|----|---------|-------------|
| 6,980,909 | B2 | 12/2005 | Root et al. |
| 7,173,651 | B1 | 2/2007  | Knowles     |
| 7,411,493 | B2 | 8/2008  | Smith       |
| 7,535,890 | B2 | 5/2009  | Rojas       |
| 8,131,597 | B2 | 3/2012  | Hudetz      |

(Continued)

FOREIGN PATENT DOCUMENTS

CA 2887596 7/2015

OTHER PUBLICATIONS

Leyden, John, "This SMS will self-destruct in 40 seconds", [Online]. Retrieved from the Internet: URL: http://www.theregisterco.uk/2005/12/12/stealthtext/, (Dec. 12, 2005), 1 pg.

*Primary Examiner* — Melur Ramakrishnaiah
(74) *Attorney, Agent, or Firm* — Schwegman Lundberg & Woessner, P.A.

(57) ABSTRACT

Systems and methods provide for capturing a plurality of segments of an audio stream and, for each segment of the plurality of segments of the audio stream: performing feature extraction on an audio signal of the segment using a feature extraction machine learning model that analyzes the audio signal to generate a feature vector for the segment and generating a prediction value for the segment for whether there is music in the segment using the extracted feature vector and a music detector machine learning model. The systems and methods further provide for generating a probability value that there is music in the audio stream based on the prediction value for each of the plurality of segments and causing the audio stream to be identified based on determining that the probability value that there is music in the audio stream meets a predetermined threshold.

20 Claims, 6 Drawing Sheets

(56) References Cited

U.S. PATENT DOCUMENTS

| | | | |
|---|---|---|---|
| 8,199,747 B2 | 6/2012 | Rojas et al. | |
| 8,332,475 B2 | 12/2012 | Rosen et al. | |
| 8,718,333 B2 | 5/2014 | Wolf et al. | |
| 8,724,622 B2 | 5/2014 | Rojas | |
| 8,874,677 B2 | 10/2014 | Rosen et al. | |
| 8,909,679 B2 | 12/2014 | Root et al. | |
| 8,995,433 B2 | 3/2015 | Rojas | |
| 9,040,574 B2 | 5/2015 | Wang et al. | |
| 9,055,416 B2 | 6/2015 | Rosen et al. | |
| 9,100,806 B2 | 8/2015 | Rosen et al. | |
| 9,100,807 B2 | 8/2015 | Rosen et al. | |
| 9,191,776 B2 | 11/2015 | Root et al. | |
| 9,204,252 B2 | 12/2015 | Root | |
| 9,443,227 B2 | 9/2016 | Evans et al. | |
| 9,489,661 B2 | 11/2016 | Evans et al. | |
| 9,491,134 B2 | 11/2016 | Rosen et al. | |
| 2011/0202598 A1 | 8/2011 | Evans et al. | |
| 2012/0209924 A1 | 8/2012 | Evans et al. | |
| 2014/0066025 A1* | 3/2014 | Maria | H04L 51/38 455/413 |
| 2015/0193199 A1* | 7/2015 | Kim | G06F 3/165 700/94 |

* cited by examiner

GENERATING A PROBABILITY OF MUSIC USING MACHINE LEARNING TECHNOLOGY

PRIORITY

This application claims the benefit of priority to U.S. Provisional Patent Application Ser. No. 62/552,983, filed on Aug. 31, 2017, the benefit of priority of each of which is claimed hereby, and each of which is incorporated by reference herein in its entirety.

BACKGROUND

Music identification services (e.g., Shazam or other music recognition service) can identify music that is playing. For example, a song may be playing in a restaurant or at a party and a user may wish to know the title and artist for the song. A user may use a computing device to capture the music playing and the computing device may use a music identification service to identify the music, for example, by matching the music playing to a music track in a library or database. In one example, the computing device may generate a fingerprint for the music that is playing and match it to a fingerprint of a track stored in the library or database. Typically, most or all of the functionality of the music detection service resides on a server or other backend computing system that can process and identify the music due to the size of the library or database and the processing power that may be needed.

BRIEF DESCRIPTION OF THE DRAWINGS

Various ones of the appended drawings merely illustrate example embodiments of the present disclosure and should not be considered as limiting its scope.

DETAILED DESCRIPTION

Systems and methods described herein relate to determining a probability that music is playing using machine learning technology, and only sending a data stream for music detection if there is a high probability that music is actually playing. For example, a user may be capturing media content (e.g., video) using a computing device (e.g., smart phone) to send to another user via a messaging application and system. For example, the user may be talking or taking a video of other people talking or singing, there may be a song playing in the background, the user may be singing, and so forth. To identify music associated with the video, the computing device may regularly send requests (e.g., every 1-2 seconds) to a music recognition service (e.g., on a backend server) to identify the music that may be playing. Moreover, a messaging system may have hundreds of millions of daily users who are all capturing media content (e.g., images and video) and sending messages containing the media content. Thus, these requests to identify music generate an incredible amount of network traffic (e.g., ten million calls per month) and also burn through the users' device data plans.

Example embodiments described herein provide for detecting a probability that music is playing and only sending the audio stream (or a portion of the audio stream) to the music recognition service if there is a probability that music is actually playing (e.g., versus just a user talking or other background noise). The examples described herein will reduce network traffic and reduce the amount of a user's device data plan needed. Moreover, example embodiments enable creative tools and services to be triggered based on the music recognition.

Figure 1:
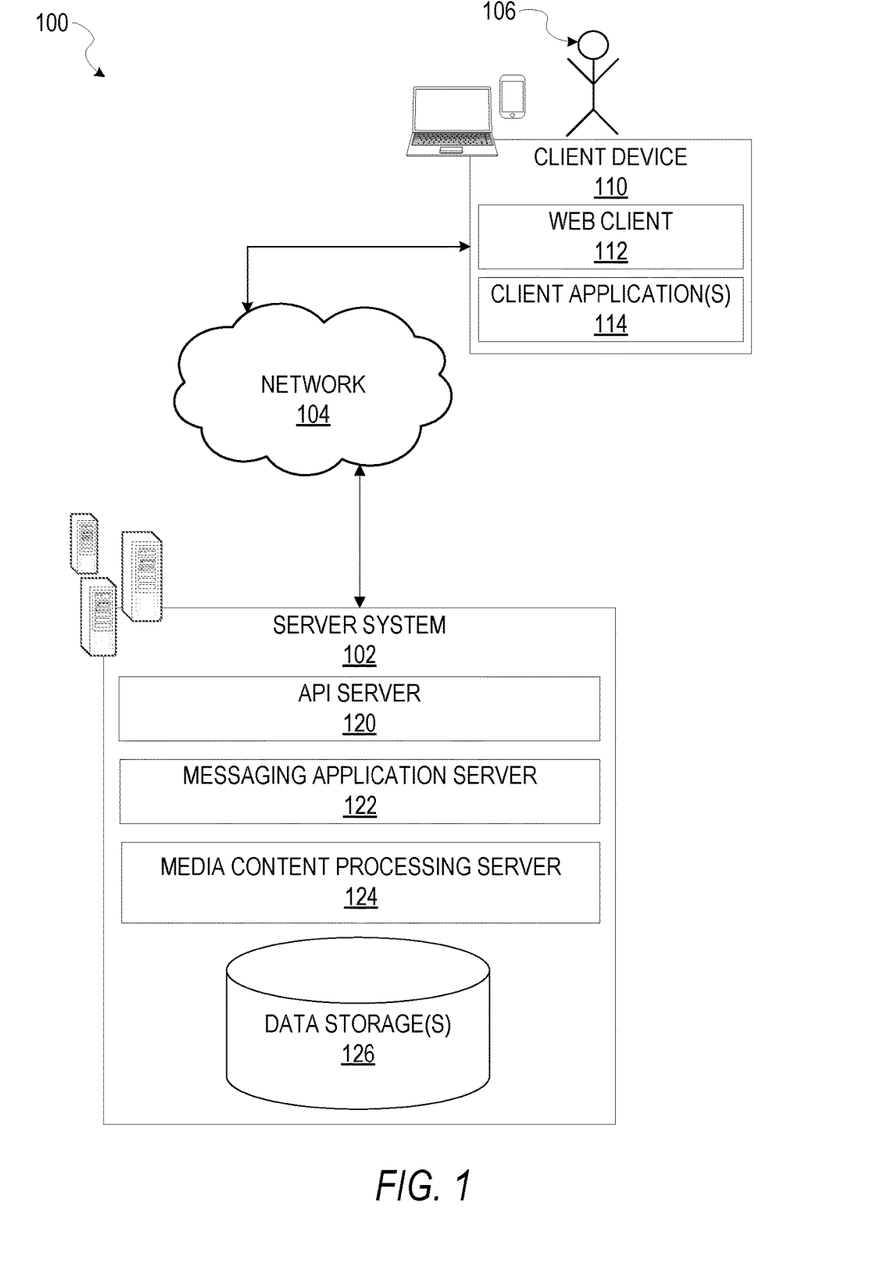
FIG. 1 is a block diagram illustrating a networked system, according to some example embodiments.

FIG. 1 is a block diagram illustrating a networked system 100, according to some example embodiments, configured to process media content items and send and receive messages that include the processed media content. In one example embodiment, the system 100 is a messaging system configured to receive a plurality of messages from a plurality of users, process media content contained in the messages, and send messages to one or more users with the processed media content. In another example, the system 100 may capture one or more segments of an audio stream associated with media content contained in a message and determine a probability that music is playing (e.g., that music is present in the audio stream). The system 100 may cause the audio stream to be identified based on the probability that music is playing and cause information associated with the identification of the music to be displayed to a user, cause creative tools or services associated with the identification of the music to be presented to the user, and so forth.

The system 100 may include one or more client devices such as client device 110. The client device 110 may also be referred to herein as a user device or a computing device. The client device 110 may comprise, but is not limited to, a mobile phone, desktop computer, laptop, portable digital assistant (PDA), smart phone, tablet, ultra book, netbook, laptop, multi-processor system, microprocessor-based or programmable consumer electronic, game console, set-top box, computer in a vehicle, or any other communication device that a user may utilize to access the networked system 100.

In some embodiments, the client device 110 may comprise a display module (not shown) to display information (e.g., in the form of user interfaces). In some embodiment the display module or user interface(s) is used to display media content such as video (e.g., conventional video and video in circular video format), images (e.g., photographs), and the like. In further embodiments, the client device 110 may comprise one or more of touch screens, accelerometers, gyroscopes, cameras, microphones, global positioning system (GPS) devices, and so forth. The client device 110 may be a device of a user that is used to create content media items such as video, images (e.g., photographs), and audio, and send and receive messages containing such media content items to and from other users.

One or more users 106 may be a person, a machine, or other means of interacting with the client device 110. In example embodiments, the user 106 may not be part of the system 100, but may interact with the system 100 via the client device 110 or other means. For instance, the user 106 may provide input (e.g., touch screen input or alphanumeric input) to the client device 110 and the input may be communicated to other entities in the system 100 (e.g., server system 102, etc.) via a network 104. In this instance, the other entities in the system 100, in response to receiving the input from the user 106, may communicate information to the client device 110 via the network 104 to be presented to the user 106. In this way, the user 106 may interact with the various entities in the system 100 using the client device 110.

The system 100 may further include a network 104. One or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

The client device 110 may access the various data and applications provided by other entities in the system 100 via web client 112 (e.g., a browser, such as the Internet Explorer® browser developed by Microsoft® Corporation of Redmond, Wash. State) or one or more client applications 114. The client device 110 may include one or more applications 114 (also referred to as "apps") such as, but not limited to, a web browser, messaging application, electronic mail (email) application, an e-commerce site application, a mapping or location application, media content editing application, a media content viewing application, an audio recognition application, and the like.

In one example, a client application 114 may be a messaging application that allows a user 106 to take a photograph or video (or receive media content from a camera device external to the client device 110), add a caption, or otherwise edit the photograph or video, and then send the photograph or video to another user. The media content may comprise audio content. The client application 114 may further allow the user 106 to view photographs or video that the user 106 has taken via the client device 110, via a separate camera device, or to view photographs and video (e.g., in conventional video format or circular video format) that another user 106 has taken via a client device 110 or camera device. The message may be ephemeral and be removed from a receiving user device after viewing or after a predetermined amount of time (e.g., 10 seconds, 24 hours, etc.).

The messaging application may further allow a user 106 to create a gallery. A gallery may be a collection of media content such as photos and videos which may be viewed by other users "following" the user's gallery (e.g., subscribed to view and receive updates in the user's gallery). The gallery may also be ephemeral (e.g., lasting 24 hours, lasting a duration of an event (e.g., during a music concert, sporting event, etc.), or other predetermined time).

An ephemeral message may be associated with a message duration parameter, the value of which determines an amount of time that the ephemeral message will be displayed to a receiving user of the ephemeral message by the client application 110. The ephemeral message may be further associated with a message receiver identifier and a message timer. The message timer may be responsible for determining the amount of time the ephemeral message is shown to a particular receiving user identified by the message receiver identifier. For example, the ephemeral message may only be shown to the relevant receiving user for a time period determined by the value of the message duration parameter.

In another example, the messaging application may allow a user 106 to store photographs and videos and create a gallery that is not ephemeral and that can be sent to other users. For example, to assemble photographs and videos from a recent vacation to share with friends and family.

In some embodiments, one or more applications 114 may be included in a given one of the client device 110, and configured to locally provide the user interface and at least some of the functionalities with the application 114 configured to communicate with other entities in the system 100 (e.g., server system 102), on an as needed basis, for data and/or processing capabilities not locally available (e.g., access location information, authenticate a user 106, verify a method of payment, access media content stored on a server, sync media content between the client device 110 and a server computer, identify audio content, etc.). Conversely, one or more applications 114 may not be included in the client device 110, and then the client device 110 may use its web browser to access the one or more applications hosted on other entities in the system 100 (e.g., server system 102).

Media content such as images and video may be captured via the client device 110 (e.g., via a camera of the client device) and/or via a separate camera device. The camera device may be a standalone camera, or may be a wearable device, such as an electronic-enabled watch, key fob, eyewear device, and the like. In one example, the camera device is an electronic enabled eyewear device, such as so-called smart glasses (e.g., SNAP SPECTACLES).

A server system 102 may provide server-side functionality via the network 104 (e.g., the Internet or wide area network (WAN)) to one or more client devices 110. The server system 102 may include an application programming interface (API) server 120, a messaging application server 122, and a media content processing server 124, which may each be communicatively coupled with each other and with one or more data storage(s) 126.

The server system 102 may be a cloud computing environment, according to some example embodiments. The server system 102, and any servers associated with the server system 102, may be associated with a cloud-based application, in one example embodiment. The one or more data storages 126 may be storage devices that store information such as untreated media content, original media content from users 106 (e.g., high quality media content), processed media content (e.g., media content that is formatted for sharing with client devices 110 and viewing on client devices 110), user information, user device information, audio content information (e.g., titles, artist, album cover art, audio fingerprints, etc.) and so forth. The one or more data storages 126 may include cloud-based storage external to the server system 102 (e.g., hosted by one or more third party entities external to the server system 102). The data storages 126 may include databases, blob storages, and so forth.

The media content processing server 124 may provide functionality to perform various processing of media content items. The media content processing server 124 may access one or more data storages 126 to retrieve stored data to use in processing media content and to store results of processed media content. The media content processing server 124 may provide functionality to determine a probability that music is playing based on audio content, cause audio content to be identified, and so forth.

The messaging application server 122 may be responsible for generation and delivery of messages between users 106 of client devices 110. The messaging application server 122 may utilize any one of a number of message delivery networks and platforms to deliver messages to users 106. For example, the messaging application server 122 may deliver messages using electronic mail (e-mail), instant message (IM), Short Message Service (SMS), text, facsimile, or voice (e.g., Voice over IP (VoIP)) messages via wired (e.g., the Internet), plain old telephone service (POTS), or wireless networks (e.g., mobile, cellular, WiFi, Long Term Evolution (LTE), Bluetooth).

As explained above, a user 106 may wish to share various media content items (e.g., videos, audio content, images, etc.) with one or more other users. For example, the user 106 may use the client device 110 or other device (e.g., camera device 108) to take various videos and photographs on his vacation. The user 106 may want to share the best videos and photographs from his vacation with his friends and family. The user 106 may utilize a client application 114 on the client device 110, such as a messaging application, to select the media content items that he would like to share.

The user 106 may also edit the various media content items using the client application 114. For example, the user 106 may add text to the media content item, choose an overlay for the media content item (labels, drawings, other artwork, etc.), may draw on the media content item, crop or alter (e.g., red-eye reduction, focus, color adjustment, etc.) the media content item, and so forth. A media content item that is "untreated" refers to a media content item that has not been edited using the client application 114. In one example, the client application 114 may provide functionality to determine a probability that music is playing in a media content item, identify the music that is playing, provide the identification information of the music playing to the user, provide media overlays or other content editing functionality or services related to the music playing, and so forth. The client application 114 may provide such functionality directly via the client application 114 or other applications on the client device 110, or may utilize functionality provided by server system 102 (e.g., via media content processing server 124).

The user 106 may select the media content items that he would like to share with his friends and family via the client application 114. Once he has selected the media content items, he may indicate that he would like to share the media content items. For example, he may choose an option on a user interface of the client application 114 (e.g., menu item, button, etc.) to indicate that he wishes to share the media content items.

The user 106 may view media content via the client application 114. For example, the user 106 may view media content he has captured on the client device 110 (e.g., via a camera of the client device 110), the user 106 may view media content captured by others and sent to the user 106, and the user 106 may view media content captured by camera device 108.

Figure 2:
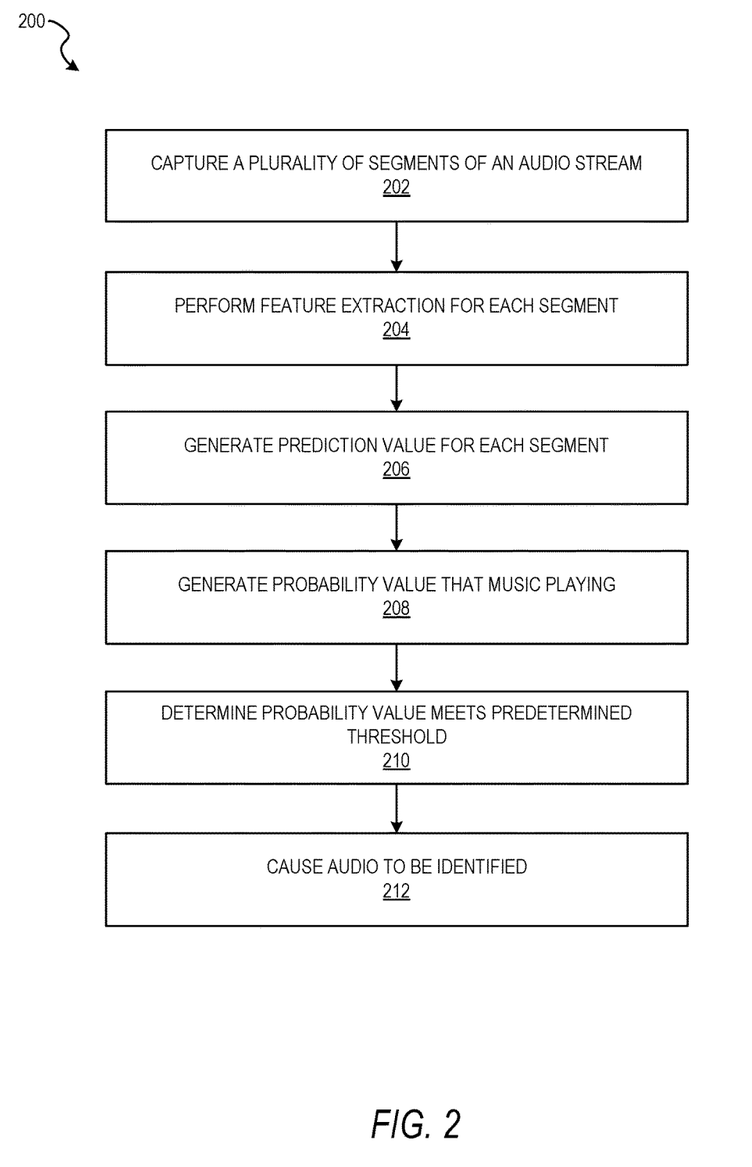
FIG. 2 is a flowchart illustrating aspects of a method, according to some example embodiments.

FIG. 2 is a flow chart illustrating aspects of a method 200, according to some example embodiments, for predicting whether or not music is playing (e.g., whether there is music in an audio stream). For illustrative purposes, method 200 is described with respect to the networked system 100 of FIG. 1. It is to be understood that method 200 may be practiced with other system configurations in other embodiments.

In one example, a user may be utilizing a messaging application to capture media content on a computing device (e.g., client device 110). For example, the user may be capturing video to store on the computing device or to send to another user. When the user 106 begins capture of the video (e.g., by interacting with a display or interface on the computing device), the computing device may detect that the user has begun capture and start capturing a plurality of segments of audio content or an audio stream associated with the video, as shown in operation 202. In one example, the computing device may start capturing the plurality of segments of the audio stream associated with the video after the computing device detects that the user has been capturing the video for a predetermined amount of time (e.g., one second, three seconds, etc.).

In another example, the user may receive a message comprising media content from another user, or may access a message previously created and stored on the computing device. The computing device may detect that the user is accessing media content of the message and start capturing a plurality of segments of audio content or an audio stream associated with the video, as shown in operation 202. Once the computing device has captured the plurality of segments of audio content and processed the audio content, the computing device may set a flag associated with the message or media content item indicating that it was already been processed. In one example, the computing device may scan all of the existing media content on the computing device and set a flag to indicate whether a media content item is processed or not so that the computing device only has to process those un-processed media content items (e.g., based on whether the flag indicates that it has not been processed yet). If the computing device determines that the media content item is already processed, based on the flag, it may not process the content again.

Optionally, in one example, the audio signals of the audio stream may be resampled to a specific (e.g., predetermined) sampling rate (e.g., R_target). For example, the computing device may detect that the audio stream has a first sampling rate. The computing device may determine whether or not the first sampling rate is the same as the predetermined sampling rate R_target (e.g., by comparing the first sampling rate to the predetermined sampling rate R_target). If the first sampling rate is the same as the predetermined sampling rate R_target, no resampling is done. If the first sampling rate is different (e.g., sampling rate R1) than the predetermined sampling rate R_target, the audio stream is resampled to the sampling rate R_target. In one example, the sampling rate R1 may be 44 kHz and the R_target may be 22 kHz, since high resolution may not be necessary to determine a prediction of music for each segment. In this example, the audio stream is down-sampled from 44 kHz to 22 kHz. Using a lower sampling rate may take less processing power and increase the processing speed. The audio stream may be also be resampled (e.g., either decreased or increased) to conform the audio stream to the predetermined sampling rate for a particular machine learning model.

In one example, each of the plurality of segments may be of a predetermined length of time (e.g., m seconds) to make up audio of a predetermined length (e.g., n seconds). For example, each segment may be one second, two seconds, three seconds, and so forth, and the plurality of segments may make up a predetermined length such as five seconds, ten seconds, fifteen seconds, and so forth of the audio stream. Also, each segment may overlap with at least one other segment. For example, each segment may be separated by a stride of a size corresponding to k seconds. For example, each segment may be three seconds in length and separated by a stride of one second, and the plurality of segments may make up a predetermined length of ten seconds, as explained further below.

Feature extraction is performed for each segment of the plurality of segments and a prediction of whether there is music in the segment is generated (e.g., whether there is music present in the segment). In operation 204, the computing device performs feature extraction for each segment captured. In one example, the computing device performs feature extraction of an audio signal of each segment, using a feature extraction machine learning model that analyzes the audio signal to generate a feature vector for the segment. In one example, the result is a two dimensional feature vector (e.g., a two-dimensional matrix) in which one dimension is a time-domain and the other dimension is a feature-domain. In one example, the feature-domain is a frequency domain. In another example, the feature-domain is output of a convolutional neural network. For example, the features generated at different convolutional layers may have different levels of abstraction.

Figure 3:
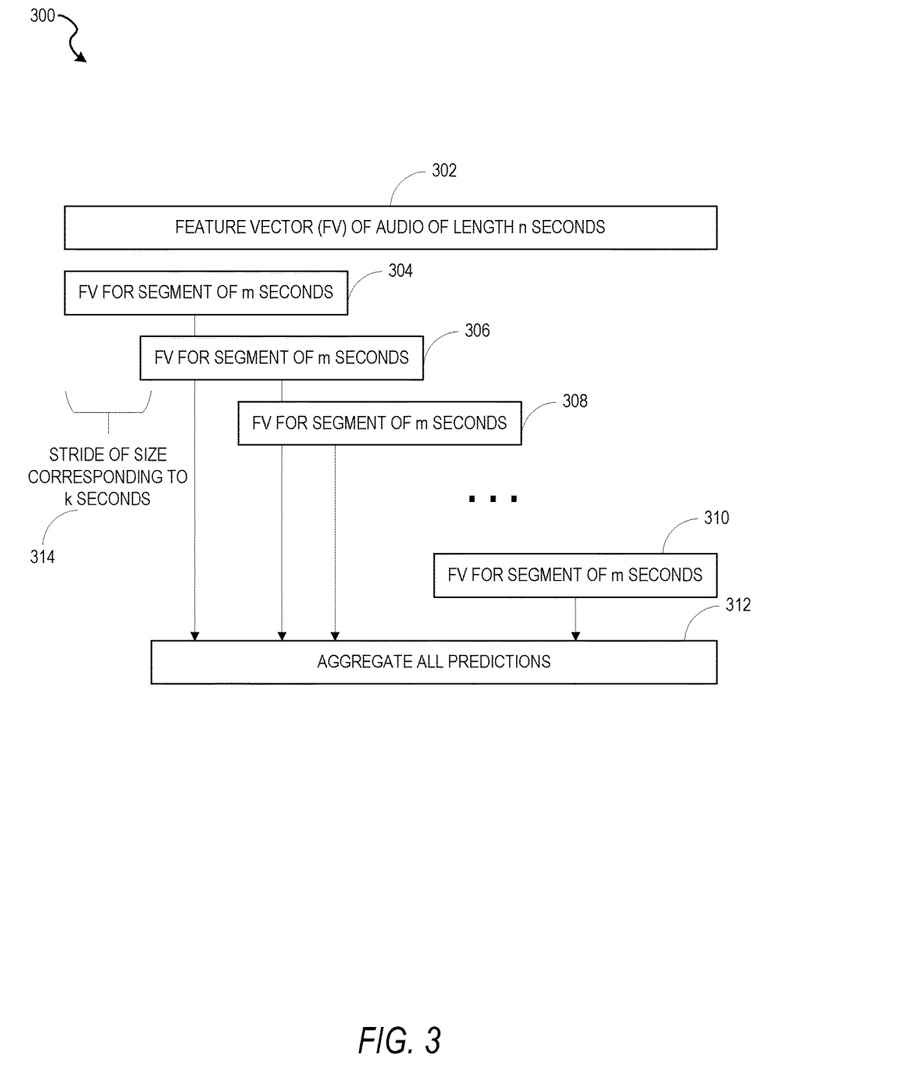
FIG. 3 is a block diagram illustrating a plurality of segments of audio content as slide-windows, according to some example embodiments.

FIG. 3 illustrates an example 300 including a feature vector (FV) of audio (e.g., an audio stream) of length n seconds 302. The example 300 shows a plurality of feature vectors for a plurality of segments of m seconds 304-310. Each of the plurality of segments may comprise a slide-window. Each slide-window may overlap in time with another segment slide-window. The plurality of segments are also referred to herein at "slide-windows."

For example, each segment 304-310 is a "slide-window" corresponding to a length of m seconds of audio and stride of k seconds. The example 300 further shows a stride of a size corresponding to k seconds 314. As explained above, each of the plurality of segments may be of a predetermined length of time (e.g., m seconds) to make up audio of a predetermined length (e.g., n seconds). For example, each segment may be one second, two seconds, three seconds, and so forth, and the plurality of segments may make up a predetermined length such as five seconds, ten seconds, fifteen seconds, and so forth of the audio stream. Also, each segment may overlap with at least one other segment. Each segment or slide-window may comprise a predetermined slide size corresponding to the amount of time between the start of a first segment or slide-window and the start of the next segment or slide-window following the first segment. For example, each segment may be separated by a stride of a size corresponding to k seconds (e.g., a time shift between two successive segments).

For example, each segment may be three seconds in length and separated by a stride of one second, and the plurality of segments may make up a predetermined length of ten seconds. In this example, the first segment 304 may represent the first 0-3 seconds of the audio, the second segment 306 may represent 1-4 seconds of the audio, the third segment 308 may represent 2-5 seconds of the audio, and so forth until the last segment 310 representing the last 8-10 seconds of the audio. Overlapping the segments may produce more accurate results.

Returning to FIG. 2, the computing device generates a prediction value for the each segment for whether there is music in the segment, at operation 206. For example, the computing device generates a prediction value for the segment for whether there is music for the segment (e.g., each slide-window) using the extracted feature vector for each segment and a music detector machine learning model (e.g., pob(has_music)_i (for the i_th slide-window)) that analyzes the feature vector for the segment. Each feature vector for each segment is input to the music detector machine learning model, which then outputs a prediction for each segment.

In one example a logistic regression model is trained based on a training set containing positive and negative samples for music detection and the logistic regression model is applied to predict whether a segment is music or not based on the feature vectors of the segment.

At operation 208, the computing device generates a probability value that there is music in the audio stream based the prediction value for each of the plurality of segments. For example, the computing device may aggregate all of the prediction values for the plurality of segments (as shown in 312 in FIG. 3) to generate a probability value between 0 and 1. The predictions may be aggregated using an aggregation function, such as mean, max, median, and the like.

In one example, there may be a predetermined threshold based on which the computing device will determine whether or not to send a request to a music recognition service to identify the audio. For example, the threshold may be 0.5, 0.7, or some other value based on the desired recall or precision ratio. At operation 210, the computing device determines whether the probability value that music is playing in the audio stream meets a predetermined threshold. For example, the computing device may compare the probability value generated based on aggregating the predictions of the plurality of segments to the predetermined threshold. If the probability value is below the threshold, a request will not be sent.

At operation 212, the computing device causes the audio stream to be identified based on determining that the probability value that there is music in the audio stream meets a predetermined threshold. For example, the computing device may send a request to a music recognition service. The music recognition service may be part of a server system 102 (e.g., media content processing server 124), associated with the server system 102, a third party server system, and so forth. The request may comprise a portion of the audio to be used for music identification. The music recognition service receives and processes the request (e.g., via a computing device such as a server computer). For example, the music recognition service may analyze the portion of the audio to generate a fingerprint of the portion of the audio and compare it to fingerprints of music stored in one or more databases. If the music recognition service finds a match, then the music recognition service will send a response to the computing device comprising information identifying the music. For example, the information may comprise a song title, artist title, cover art of the album in which the title was released, date the song was released, and so forth. The music recognition service may return one or more of the information available for the music.

Once the computing device receives the response from the server computing device associated with the music detection service, it may display some or all of the music information to the user. The computing device may also use the information returned to generate creative tools and services related to the music. For example, the computing device may generate media overlays with the title and artist information, a link to buy the music (e.g., song or album), art specific to the music, and so forth.

As explained above, both the feature extraction and the prediction (or inference) are achieved using machine learning models. In one embodiment, the feature extraction and music detection is performed in a single deep neural network trained on a set of training data that is labeled with music and non-music. The input of the deep neural network is m-seconds of audio (e.g., at a sampling rate of R_target), and the output is a probability of whether this m-seconds of audio is music or not. The predictions of all of the sliding windows are aggregated into a single prediction for the entire audio clip, as explained above.

In another embodiment, the feature extraction model and music detection model are separately trained. The feature model is a convolutional neural network trained using transfer learning on a large amount of videos. The convolutional neural network is trained to be able to classify objects and scenes as close as possible to the classification results on the associated video frames using existing state of art computer vision models, such that a good representation of the audio signals is expected to be learned through training over a large number of videos. An example of such a convolutional neural network is shown in FIG. 4.

Figure 4:
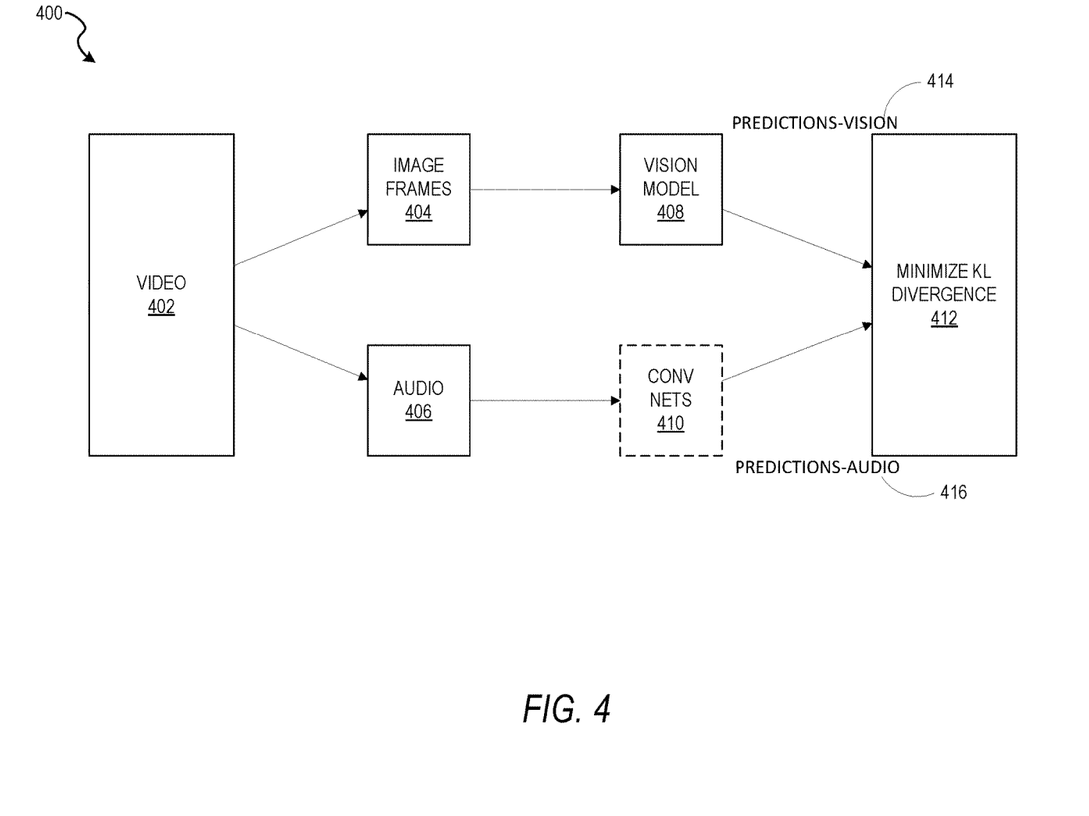
FIG. 4 is a block diagram illustrating an example machine learning model, according to some example embodiments.

The music detector model shown in FIG. 4 is a binary classification model. The model is trained on feature vectors of the audio segments of lengths corresponding to each slide-window, such that a prediction/classification can be made per slide-window. Hence, for a given audio clip, predictions will be made on each slide-window along the time axis, and the predictions are then aggregated to give a final prediction on whether there is music playing, as explained above. A threshold can be tuned at this stage to generate a desired recall/precision ratio.

The machine learning models may be trained using data specific to a messaging network, such a plurality of messages comprising media content. In one example, a machine learning model may be trained using a predetermined amount of messages containing media content (e.g., 2000, 5000, 10,000, etc., messages or 5 hours, 10 hours, etc. of data, etc.). The predetermined amount of messages, or training data, may be labeled based on whether or not the media content associated with each message has music or not. For example, each message may be labeled as having music (e.g., an identifiable song or other audio content associated with the media content) or not having music (e.g., no music, miscellaneous speech by one or more users talking in the video, etc.). This training data may be used to train the machine learning model that is then used to predict music playing for each segment input into the machine learning model.

In one example, data from shared stories or media content collections are collected and may be manually labeled and used to train a machine learning model.

Figure 5:
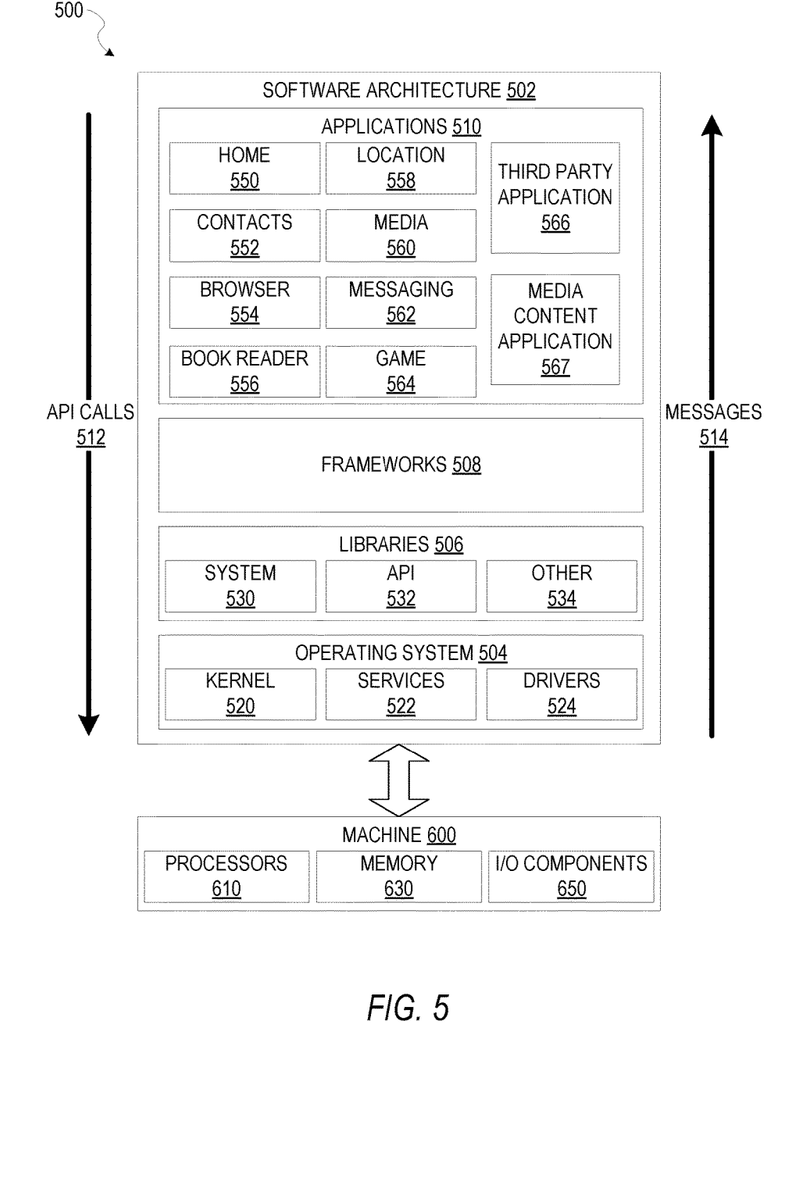
FIG. 5 is a block diagram illustrating an example of a software architecture that may be installed on a machine, according to some example embodiments.

FIG. 5 is a block diagram 500 illustrating software architecture 502, which can be installed on any one or more of the devices described above. For example, in various embodiments, client devices 110 and server systems 102, 120, 122, and 124 may be implemented using some or all of the elements of software architecture 502. FIG. 5 is merely a non-limiting example of a software architecture, and it will be appreciated that many other architectures can be implemented to facilitate the functionality described herein. In various embodiments, the software architecture 502 is implemented by hardware such as machine 1300 of FIG. 6 that includes processors 610, memory 630, and input/output (I/O) components 650. In this example, the software architecture 502 can be conceptualized as a stack of layers where each layer may provide a particular functionality. For example, the software architecture 502 includes layers such as an operating system 504, libraries 506, frameworks 508, and applications 510. Operationally, the applications 510 invoke application programming interface (API) calls 512 through the software stack and receive messages 514 in response to the API calls 512, consistent with some embodiments.

In various implementations, the operating system 504 manages hardware resources and provides common services. The operating system 504 includes, for example, a kernel 520, services 522, and drivers 524. The kernel 520 acts as an abstraction layer between the hardware and the other software layers, consistent with some embodiments. For example, the kernel 520 provides memory management, processor management (e.g., scheduling), component management, networking, and security settings, among other functionality. The services 522 can provide other common services for the other software layers. The drivers 524 are responsible for controlling or interfacing with the underlying hardware, according to some embodiments. For instance, the drivers 524 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 506 provide a low-level common infrastructure utilized by the applications 510. The libraries 506 can include system libraries 530 (e.g., C standard library) that can provide functions such as memory allocation functions, string manipulation functions, mathematic functions, and the like. In addition, the libraries 506 can include API libraries 532 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in graphic content on a display), database libraries (e.g., SQLite to provide various relational database functions), web libraries (e.g., WebKit to provide web browsing functionality), and the like. The libraries 506 can also include a wide variety of other libraries 534 to provide many other APIs to the applications 510.

The frameworks 508 provide a high-level common infrastructure that can be utilized by the applications 510, according to some embodiments. For example, the frameworks 508 provide various graphic user interface (GUI) functions, high-level resource management, high-level location services, and so forth. The frameworks 508 can provide a broad spectrum of other APIs that can be utilized by the applications 510, some of which may be specific to a particular operating system 504 or platform.

In an example embodiment, the applications 510 include a home application 550, a contacts application 552, a browser application 554, a book reader application 556, a location application 558, a media application 560, a messaging application 562, a game application 564, and a broad assortment of other applications such as a third party application(s) 566 and media content application 567. According to some embodiments, the applications 510 are programs that execute functions defined in the programs. Various programming languages can be employed to create one or more of the applications 510, structured in a variety of manners, such as object-oriented programming languages (e.g., Objective-C, Java, or C++) or procedural programming languages (e.g., C or assembly language). In a specific example, the third party application 566 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third party application 566 can invoke the API calls 512 provided by the operating system 504 to facilitate functionality described herein.

Figure 6:
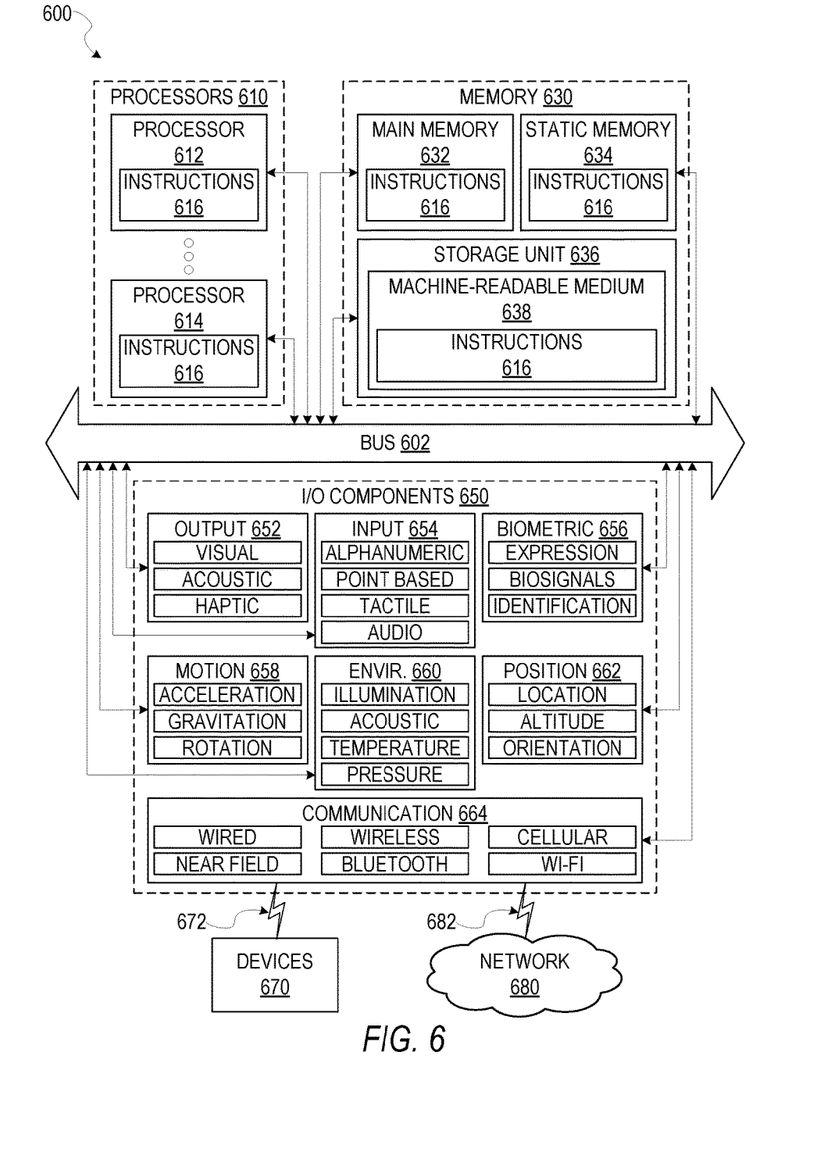
FIG. 6 illustrates a diagrammatic representation of a machine, in the form of a computer system, within which a set of instructions may be executed for causing the machine to perform any one or more of the methodologies discussed herein, according to some example embodiments.

As explained above, some embodiments may particularly include a messaging application 562. In certain embodiments, this may be a stand-alone application that operates to manage communications with a server system such as server system 102. In other embodiments, this functionality may be integrated with another application such as a media content application 567. Messaging application 562 may request and display various media content items and may provide the capability for a user to input data related to media content items via a touch interface, keyboard, or using a camera device of machine 600, communication with a server system via I/O components 650, and receipt and storage of media content items in memory 630. Presentation of media content items and user inputs associated with media content items may be managed by messaging application 562 using different frameworks 508, library 506 elements, or operating system 504 elements operating on a machine 600.

FIG. 6 is a block diagram illustrating components of a machine 600, according to some embodiments, able to read instructions from a machine-readable medium (e.g., a machine-readable storage medium) and perform any one or more of the methodologies discussed herein. Specifically, FIG. 13 shows a diagrammatic representation of the machine 600 in the example form of a computer system, within which instructions 616 (e.g., software, a program, an application 510, an applet, an app, or other executable code) for causing the machine 600 to perform any one or more of the methodologies discussed herein can be executed. In alternative embodiments, the machine 600 operates as a standalone device or can be coupled (e.g., networked) to other machines. In a networked deployment, the machine 600 may operate in the capacity of a server machine 102, 120, 122, 124, etc., or a client device 110 in a server-client network environment, or as a peer machine in a peer-to-peer (or distributed) network environment. The machine 600 can comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 616, sequentially or otherwise, that specify actions to be taken by the machine 600. Further, while only a single machine 600 is illustrated, the term "machine" shall also be taken to include a collection of machines 600 that individually or jointly execute the instructions 616 to perform any one or more of the methodologies discussed herein.

In various embodiments, the machine 600 comprises processors 610, memory 630, and I/O components 650, which can be configured to communicate with each other via a bus 602. In an example embodiment, the processors 610 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 612 and a processor 614 that may execute the instructions 616.

The term "processor" is intended to include multi-core processors 610 that may comprise two or more independent processors 612, 614 (also referred to as "cores") that can execute instructions 616 contemporaneously. Although FIG. 6 shows multiple processors 610, the machine 600 may include a single processor 610 with a single core, a single processor 610 with multiple cores (e.g., a multi-core processor 610), multiple processors 612, 614 with a single core, multiple processors 612, 614 with multiples cores, or any combination thereof.

The memory 630 comprises a main memory 632, a static memory 634, and a storage unit 636 accessible to the processors 610 via the bus 602, according to some embodiments. The storage unit 636 can include a machine-readable medium 638 on which are stored the instructions 616 embodying any one or more of the methodologies or functions described herein. The instructions 616 can also reside, completely or at least partially, within the main memory 632, within the static memory 634, within at least one of the processors 610 (e.g., within the processor's cache memory), or any suitable combination thereof, during execution thereof by the machine 600. Accordingly, in various embodiments, the main memory 632, the static memory 634, and the processors 610 are considered machine-readable media 1338.

As used herein, the term "memory" refers to a machine-readable medium 638 able to store data temporarily or permanently and may be taken to include, but not be limited to, random-access memory (RAM), read-only memory (ROM), buffer memory, flash memory, and cache memory. While the machine-readable medium 638 is shown, in an example embodiment, to be a single medium, the term "machine-readable medium" should be taken to include a single medium or multiple media (e.g., a centralized or distributed database, or associated caches and servers) able to store the instructions 616. The term "machine-readable medium" shall also be taken to include any medium, or combination of multiple media, that is capable of storing instructions (e.g., instructions 616) for execution by a machine (e.g., machine 600), such that the instructions 616, when executed by one or more processors of the machine 600 (e.g., processors 610), cause the machine 600 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 650 include a wide variety of components to receive input, provide output, produce output, transmit information, exchange information, capture measurements, and so on. In general, it will be appreciated that the I/O components 650 can include many other components that are not shown in FIG. 13. The I/O components 650 are grouped according to functionality merely for simplifying the following discussion, and the grouping is in no way limiting. In various example embodiments, the I/O components 650 include output components 652 and input components 654. The output components 652 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 654 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 650 include biometric components 656, motion components 658, environmental components 660, or position components 662, among a wide array of other components. For example, the biometric components 656 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 658 include acceleration sensor components (e.g., accelerometer), gravitation sensor components, rotation sensor components (e.g., gyroscope), and so forth. The environmental components 660 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 662 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 650 may include communication components 664 operable to couple the machine 600 to a network 680 or devices 670 via a coupling 682 and a coupling 672, respectively. For example, the communication components 664 include a network interface component or another suitable device to interface with the network 680. In further examples, communication components 664 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 670 may be another machine 600 or any of a wide variety of peripheral devices (e.g., a peripheral device coupled via a Universal Serial Bus (USB)).

Moreover, in some embodiments, the communication components 664 detect identifiers or include components operable to detect identifiers. For example, the communication components 664 include radio frequency identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 664, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 680 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 680 or a portion of the network 680 may include a wireless or cellular network, and the coupling 682 may be a Code Division Multiple Access (CDMA) connection, a Global System for Mobile communications (GSM) connection, or another type of cellular or wireless coupling. In this example, the coupling 682 can implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 616 are transmitted or received over the network 680 using a transmission medium via a network interface device (e.g., a network interface component included in the communication components 664) and utilizing any one of a number of well-known transfer protocols (e.g., Hypertext Transfer Protocol (HTTP)). Similarly, in other example embodiments, the instructions 616 are transmitted or received using a transmission medium via the coupling 672 (e.g., a peer-to-peer coupling) to the devices 670. The term "transmission medium" shall be taken to include any intangible medium that is capable of storing, encoding, or carrying the instructions 616 for execution by the machine 600, and includes digital or analog communications signals or other intangible media to facilitate communication of such software.

Furthermore, the machine-readable medium 638 is non-transitory (in other words, not having any transitory signals) in that it does not embody a propagating signal. However, labeling the machine-readable medium 638 "non-transitory" should not be construed to mean that the medium is incapable of movement; the medium 638 should be considered as being transportable from one physical location to another. Additionally, since the machine-readable medium 638 is tangible, the medium 638 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
   capturing, by a computing device, a plurality of segments of an audio stream;
   for each segment of the plurality of segments of the audio stream:
      performing, by the computing device, feature extraction on an audio signal of the segment using a feature extraction machine learning model that analyzes the audio signal to generate a feature vector for the segment;
      generating, by the computing device, a prediction value for the segment for whether there is music in the segment using the extracted feature vector and a music detector machine learning model that analyzes the feature vector for the segment;
   generating, by the computing device, a probability value that there is music in the audio stream based on aggregating the prediction values of the plurality of segments;
   determining, by the computing device, that the probability value that there is music in the audio stream meets a predetermined threshold; and
   causing the audio stream to be identified based on determining that the probability value that there is music in the audio stream meets a predetermined threshold.

2. The method of claim 1, wherein the audio stream has a first sampling rate, and wherein after capturing the plurality of segments of the audio stream, the method further comprises:
   resampling the plurality of audio segments of the audio stream to a second sampling rate.

3. The method of claim 2, wherein the plurality of segments of the audio stream is down sampled from the first sampling rate to the second sampling rate.

4. The method of claim 1, further comprising:
   determining a first sampling rate of the audio stream;
   determining that the first sampling rate of the audio stream is different than a predetermined sampling rate; and
   resampling the audio stream from the first sampling rate to the predetermined sampling rate.

5. The method of claim 1, wherein the feature vector is a two dimensional feature vector, wherein a first dimension of the two dimensional feature vector is a time-domain for the segment, and a second dimension of the two dimensional feature vector is a feature-domain for the segment.

6. The method of claim 5, wherein the feature-domain for the segment is a frequency domain.

7. The method of claim 1, wherein the music detection machine learning model is trained using a plurality of messages comprising media content.

8. The method of claim 1, wherein the plurality of segments of the audio stream are captured from media content of a message in a messaging system.

9. The method of claim 8, further comprising:
   setting a flag associated with the message indicating that the audio stream has already been processed.

10. The method of claim 1, wherein each segment comprises a slide-window that overlaps in time with another segment.

11. The method of claim 10, wherein each slide-window comprises a predetermined stride size corresponding to an amount of time between the start of a first segment and the start of a next segment following the first segment.

12. The method of claim 1, wherein causing the audio stream to be identified based on determining that the probability value that there is music in the audio stream meeting a predetermined threshold comprises:
   sending a request to a server computing device to request that the audio stream be identified; and
   receiving a response, from the server computing device, that includes identity information for the audio stream.

13. The method of claim 1, further comprising:
   scanning media content stored on the computing device;
   identifying media content that has had an associated audio stream processed; and
   setting a flag for each identified media content indicating that an audio stream associated with the media content has been processed.

14. A computing device comprising:
a processor; and
a computer readable medium coupled with the processor, the computer readable medium comprising instructions stored thereon that are executable by the processor to cause a computing device to perform operations comprising:
capturing a plurality of segments of an audio stream;
for each segment of the plurality of segments of the audio stream:
   performing feature extraction on an audio signal of the segment using a feature extraction machine learning model that analyzes the audio signal to generate a feature vector for the segment;
   generating a prediction value for the segment for whether there is music in the segment using the extracted feature vector and a music detector machine learning model that analyzes the feature vector for the segment;
generating a probability value that there is music in the audio stream based on aggregating the prediction values of the plurality of segments;
determining that the probability value that there is music in the audio stream meets a predetermined threshold; and
causing the audio stream to be identified based on determining that the probability value that there is music in the audio stream meets a predetermined threshold.

15. The computing device of claim 14, wherein the feature vector is a two dimensional feature vector, wherein a first dimension of the two dimensional feature vector is a time-domain for the segment, and a second dimension of the two dimensional feature vector is a feature-domain for the segment.

16. The computing device of claim 15, wherein the feature-domain for the segment is a frequency domain.

17. The computing device of claim 14, wherein the plurality of segments of the audio stream are captured from media content of a message in a messaging system.

18. The computing device of claim 14, wherein each segment comprises a slide-window that overlaps in time with another segment and wherein each slide-window comprises a predetermined stride size corresponding to an amount of time between the start of a first segment and the start of a next segment following the first segment.

19. The computing device of claim 14, wherein causing the audio stream to be identified based on determining that the probability value that there is music in the audio stream meeting a predetermined threshold comprises:
   sending a request to a server computing device to request that the audio stream be identified; and
   receiving a response, from the server computing device, that includes identity information for the audio stream.

20. A non-transitory computer readable medium comprising instructions stored thereon that are executable by at least one processor to cause a computing device to perform operations comprising:
capturing a plurality of segments of an audio stream;
for each segment of the plurality of segments of the audio stream:
   performing feature extraction on an audio signal of the segment using a feature extraction machine learning model that analyzes the audio signal to generate a feature vector for the segment;
   generating a prediction value for the segment for whether there is music in the segment using the extracted feature vector and a music detector machine learning model that analyzes the feature vector for the segment;
generating a probability value that there is music in the audio stream based on aggregating the prediction values of the plurality of segments;
determining that the probability value that there is music in the audio stream meets a predetermined threshold; and
causing the audio stream to be identified based on determining that the probability value that there is music in the audio stream meets a predetermined threshold.

* * * * *